(12) United States Patent
Kaneko et al.

(10) Patent No.: US 11,997,951 B2
(45) Date of Patent: Jun. 4, 2024

(54) LAWN MOWER AND CONTROL SYSTEM DETERMINING WHETHER GROUND IS LAWN

(71) Applicant: HONDA MOTOR CO., LTD., Tokyo (JP)

(72) Inventors: Runa Kaneko, Wako (JP); Koji Kuriyagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 917 days.

(21) Appl. No.: 16/982,169

(22) PCT Filed: Mar. 23, 2018

(86) PCT No.: PCT/JP2018/011850
§ 371 (c)(1),
(2) Date: Sep. 18, 2020

(87) PCT Pub. No.: WO2019/180951
PCT Pub. Date: Sep. 26, 2019

(65) Prior Publication Data
US 2021/0022293 A1  Jan. 28, 2021

(51) Int. Cl.
*A01D 69/00*  (2006.01)
*A01D 34/00*  (2006.01)
(Continued)

(52) U.S. Cl.
CPC ........... *A01D 75/28* (2013.01); *A01D 34/008* (2013.01); *A01D 34/64* (2013.01); *A01D 34/86* (2013.01);
(Continued)

(58) Field of Classification Search
CPC .. A01D 2101/00; A01D 69/00; A01D 34/006; A01D 34/008; A01D 34/6806;
(Continued)

(56) References Cited

U.S. PATENT DOCUMENTS 4,678,056 A * 7/1987 Kobari ............... B60T 8/58
180/197
5,319,368 A * 6/1994 Poholek .............. B62B 5/0423
340/988
(Continued)

FOREIGN PATENT DOCUMENTS

CN  109417899 A * 3/2019  ......... A01D 41/1271
DE  19931141 B4 * 3/2005  .......... A01D 34/006
(Continued)

OTHER PUBLICATIONS

European Search Report dated Feb. 12, 2021, 7 pages.
(Continued)

*Primary Examiner* — Adam J Behrens
(74) *Attorney, Agent, or Firm* — Rankin, Hill & Clark LLP (57) ABSTRACT

The configuration includes: a motor for driving a driving wheel (rear wheel) provided to a body; a slip ratio calculating section for calculating a slip ratio while the lawn mower is traveling; a friction coefficient calculating section for calculating a friction coefficient of a ground on which the lawn mower is traveling; a determination section for determining whether the ground on which the lawn mower is traveling is a lawn based on a relationship between the slip ratio and the friction coefficient and a drive controlling section for controlling the motor based on a determination result from the determination section. This configuration allows suitable driving operability for both of a case where the ground on which a lawn mowers traveling is a lawn and a case where the ground is other than a lawn.

22 Claims, 6 Drawing Sheets

(51) Int. Cl.
*A01D 34/64* (2006.01)
*A01D 34/86* (2006.01)
*A01D 75/28* (2006.01)
*A01D 101/00* (2006.01)

(52) U.S. Cl.
CPC .......... *A01D 69/00* (2013.01); *A01D 2101/00* (2013.01)

(58) Field of Classification Search
CPC ............ A01D 34/86; A01D 2034/6825; A01D 75/18; A01D 75/28
See application file for complete search history.

(56) References Cited

U.S. PATENT DOCUMENTS

| | | | | |
|---|---|---|---|---|
| 6,422,333 | B1* | 7/2002 | Kjær | B60T 8/3205 180/197 |
| 8,521,384 | B2* | 8/2013 | O'Connor | A01D 34/006 701/72 |
| 2009/0192691 | A1* | 7/2009 | O'Connor | A01D 34/44 180/197 |
| 2012/0136539 | A1* | 5/2012 | Bryant | B60K 28/16 701/42 |

FOREIGN PATENT DOCUMENTS

| | | |
|---|---|---|
| JP | H02-203047 | 8/1990 |
| JP | H11-254986 | 9/1999 |
| JP | 2002-152905 | 5/2002 |
| JP | 2003-095145 | 4/2003 |
| JP | 2004-350475 | 12/2004 |
| JP | 2012-075254 | 4/2012 |
| WO | 2015/079553 A1 | 6/2015 |

OTHER PUBLICATIONS

International Search Report, dated Jun. 19, 2018, 2 pages.
Written Opinion of the International Searching Authority dated Jun. 19, 2018 filed in PCT/JP2018/011850, 5 pages.
International Preliminary Report on Patentability dated Sep. 29, 2020, 9 pages.

* cited by examiner

LAWN MOWER AND CONTROL SYSTEM DETERMINING WHETHER GROUND IS LAWN

TECHNICAL FIELD

The present invention relates to a lawn mower and a control system.

BACKGROUND ART

Conventionally known lawn mowers include what is called a riding lawn mower provided with a body having wheels and a seat on which a driver rides (see Patent Literature 1, for example).

CITATION LIST

Patent Literature

Patent Literature 1: Japanese Patent Laid Open No. 2003-95145

SUMMARY OF INVENTION

Technical Problem

The driver may drive the lawn mower to travel not only on a lawn but also on a paved road. However, conventional lawn mowers have been unable to achieve suitable driving operability for both of a case where the ground on which the lawn mower is traveling is a lawn and a case where the ground is other than a lawn.

It is an objective of the present invention to provide a lawn mower and a control system that can achieve suitable driving operability for both of a case where the ground on which the lawn mower is traveling is a lawn and a case where the ground is other than a lawn.

Solution to Problem

An aspect of the present invention provides a lawn mower including: a motor for driving a driving wheel provided to a body; a slip ratio calculating section for calculating a slip ratio indicating a magnitude of slip while the lawn mower is traveling; a friction coefficient calculating section for calculating a friction coefficient of a ground on which the lawn mower is traveling; a determination section for determining whether the ground on which the lawn mower is traveling is a lawn based on a relationship between the slip ratio calculated by the slip ratio calculating section and the friction coefficient calculated by the friction coefficient calculating section; and a drive controlling section for controlling the motor based on a determination result from the determination section.

According to an aspect of the present invention, in the lawn mower, when the determination section determines that the ground on which the lawn mower is traveling is a lawn, the drive controlling section performs lawn traveling control to rotate the driving wheel at a torque greater than or equal to a predetermined torque, and when the determination section determines that the ground on which the lawn mower is traveling is other than a lawn, the drive controlling section performs non-lawn traveling control to rotate the driving wheel at a torque less than the predetermined torque.

According to an aspect of the present invention, the lawn mower includes a work section controlling section for controlling a lawn cutting blade, and when the determination section determines that the ground on which the lawn mower is traveling is other than a lawn, the work section controlling section puts the lawn cutting blade in a non-operational state.

According to an aspect of the present invention, in the lawn mower, when the determination section determines that the ground on which the lawn mower is traveling is other than a lawn, the work section controlling section puts the lawn cutting blade in an elevated state.

According to an aspect of the present invention, the lawn mower includes a traction control system for implementing a traction control system, when the determination section determines that the ground on which the lawn mower is traveling is a lawn, the drive controlling section turns on the traction control system, and when the determination section determines that the ground on which the lawn mower is traveling is other than a lawn, the drive controlling section turns off the traction control system.

According to an aspect of the present invention, in the lawn mower, the slip ratio calculating section calculates a slip ratio for each of left and right sides of the body, the friction coefficient calculating section calculates a friction coefficient for each of the left and right sides of the body, and when the determination section determines that the ground on which the lawn mower is traveling is a lawn for at least one of the left and right sides of the body, the drive controlling section performs the lawn traveling control.

According to an aspect of the present invention, the lawn mower includes an inclination angle detecting section for detecting an inclination angle of the body in a left-right direction, and the friction coefficient calculating section includes a correction section for correcting the friction coefficient based on the inclination angle detected by the inclination angle detecting section.

According to an aspect of the present invention, in the lawn mower, the body is provided with a driven wheel, the slip ratio calculating section calculates the slip ratio based on a driven wheel speed of the driven wheel and a driving wheel speed indication value of the driving wheel, and the friction coefficient calculating section calculates the friction coefficient based on the driven wheel speed, of the driven wheel, used for calculating the slip ratio.

An aspect of the present invention is a control system for a lawn mower including a body and a motor for driving a driving wheel provided to the body, the control system including: a slip ratio calculating section for calculating a slip ratio indicating a magnitude of slip while the lawn mower travels; a friction coefficient calculating section for calculating a friction coefficient of a ground on which the lawn mower is traveling; a determination section for determining whether the ground on which the lawn mower is traveling is a lawn based on a relationship between the slip ratio calculated by the slip ratio calculating section and the friction coefficient calculated by the friction coefficient calculating section; and a control section for controlling the motor based on a determination result from the determination section.

Advantageous Effect of Invention

According to the aspects of the present invention, suitable driving operability can be achieved for both of a case where the ground on which the lawn mower is traveling is a lawn and a case where the ground is other than a lawn.

DESCRIPTION OF EMBODIMENTS

The following describes embodiments of the present invention with reference to the drawings.

Figure 1:
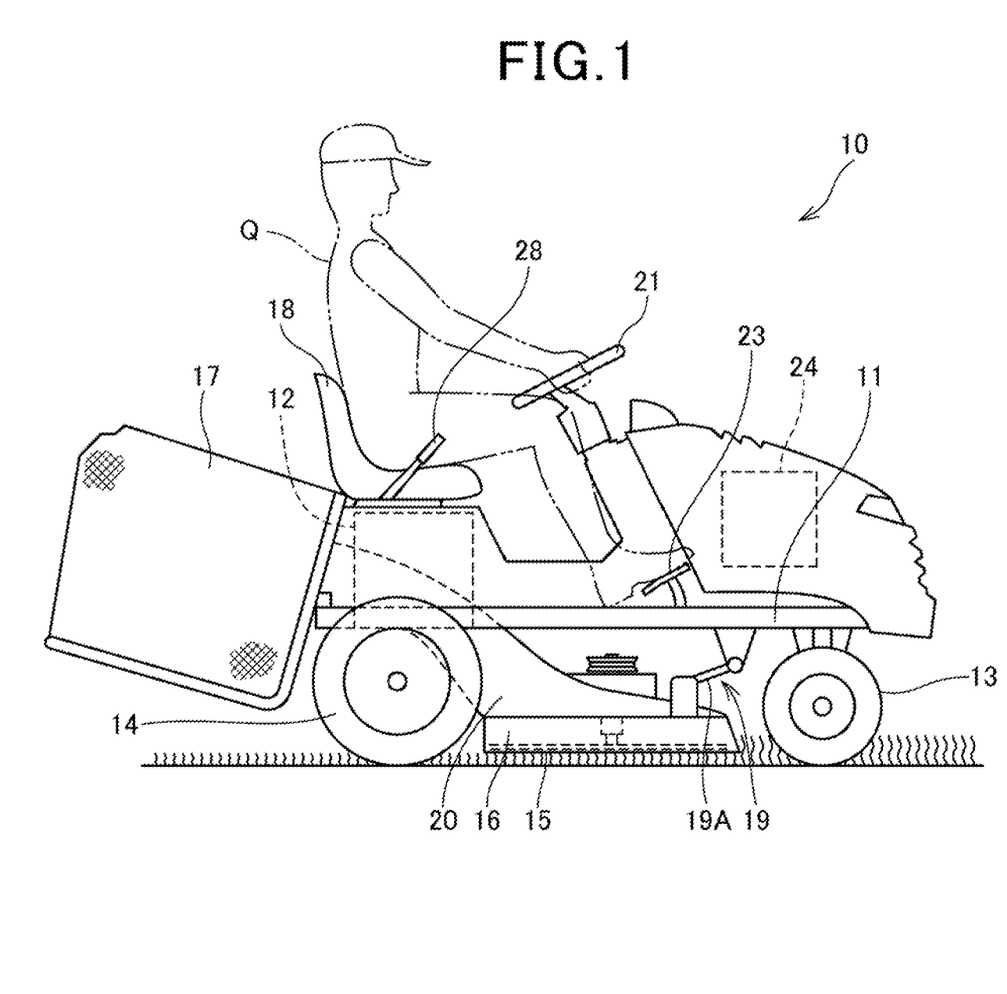
FIG. 1 is a right-side view of a riding lawn mower according to an embodiment of the present invention.
Figure 2:
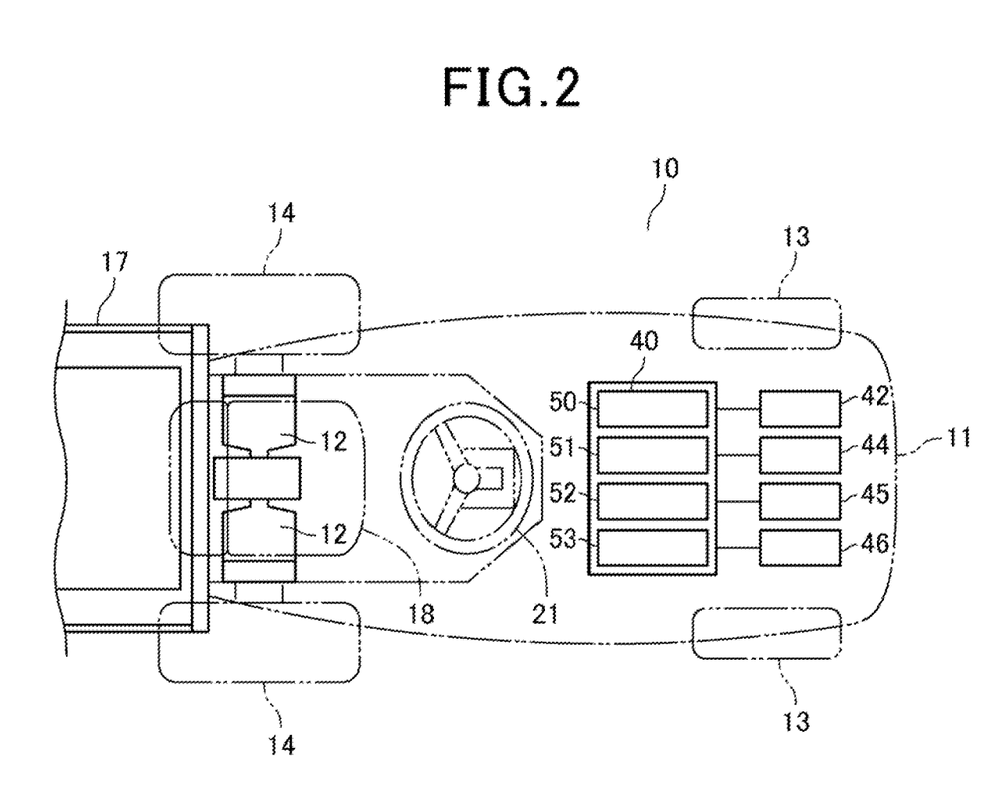
FIG. 2 is a plan view of the riding lawn mower.

FIG. 1 is a right-side view of a riding lawn mower 10 according to this embodiment. FIG. 2 is a plan view of the riding lawn mower 10. Note that FIG. 2 schematically shows electrical configuration while omitting some components shown in FIG. 1. Also, hereinafter, a forward direction refers to the traveling direction of the riding lawn mower 10, a backward direction refers to the reversing direction thereof, and a left-right direction refers to a direction orthogonal to the forward and backward directions.

As shown in FIG. 1 and FIG. 2, the riding lawn mower 10 includes a body 11. The body 11 includes motors 12 and 12 as drive sources, left and right rear wheels 14 and 14 as driving wheels provided at a rear part of the body 11 and driven by the motors 12 and 12, left and right front wheels 13 and 13 as driven wheels provided at a front part of the body 11, a rotary blade 15 as a work section provided at a lower part of the body 11 for cutting lawn, a rotary blade housing 16 surrounding the rotary blade 15 for guiding the cut lawn grass backward, a grass bag 17 arranged at the rear end of the rotary blade housing 16 for storing the cut lawn grass, a seat 18 on which a passenger Q sits, and an engine 24 for driving the rotary blade 15.

The riding lawn mower 10 also includes a raising and lowering mechanism 19 for raising and lowering the rotary blade housing 16, and the raising and lowering mechanism 19 includes a support link 19A for supporting the rotary blade housing 16 in a raisable and lowerable manner. Besides these, the riding lawn mower 10 is also provided with a grass duct 20, a steering wheel 21 for steering the front wheels 13 and 13, an accelerator pedal 23 for adjusting the accelerator position, a vehicle speed control lever 28 for setting the vehicle speed, and the like.

As shown in FIG. 2, the motors 12 and 12 are provided for the respective ones of the left and right rear wheels 14 and 14 on the left and right sides of the body 11. A speed reducer is attached to each of the motors 12 and 12, and power from the motors 12 and 12 is transmitted to the rear wheels 14 and 14 through the speed reducer to rotationally drive the rear wheels 14 and 14 to cause the body 11 to travel. The front wheels 13 and 13 then rotate by being driven with the traveling body 11.

When the riding lawn mower is traveling for cutting lawn, the rotary blade 15 (blade) as the work section is rotationally driven by the engine 24 as described above. The rotary blade 15 rotates to cut lawn grass and further to generate air flow circling in the rotary blade housing 16. The lawn grass cut by the rotary blade 15 is then suctioned up by the air flow in the rotary blade housing 16 and is collected in the grass bag 17 through the grass duct 20.

As shown in FIG. 2, the riding lawn mower 10 includes a control unit 40, a slip ratio detecting sensor 42, a friction coefficient detecting sensor 44, a motor control unit 45 for controlling the motors 12 and 12, and a traction control system 46.

The control unit 40 controls each unit of the riding lawn mower 10. The control unit 40 includes a computer provided with a processor 50 such as a CPU or an MPU, a memory device 51 such as a ROM or a RAM, a storage device 52 such as an HDD or an SSD, and an interface circuit 53 for connecting sensors, peripheral devices and the like. The processor 50 executes computer programs stored in the memory device 51 or the storage device 52 to implement various functions. The functional configuration of the control unit 40 will be described later. Note that the control unit 40 may include a plurality of computers so that the computers cooperate to implement the various functions.

The slip ratio detecting sensor 42 includes various detection devices for detecting a slip ratio λ while the riding lawn mower 10 is traveling. The slip ratio λ is a value that quantifies the magnitude of slip occurring while the riding lawn mower 10 is traveling, and in this embodiment is defined by the following equation (1).

$$\text{slip ratio } \lambda = (\text{driven wheel speed} - \text{driving wheel speed})/\text{driving wheel speed} \quad (1)$$

Note that the driving wheel speed is the speed of the rear wheels 14, which are driving wheels, and the driven wheel speed is the speed of the front wheels 13, which are driven wheels.

According to this definition of the slip ratio λ, the value of slip ratio λ increases and approaches "1" as a larger slip occurs.

The slip ratio detecting sensor 42 includes a driven wheel speed sensor for detecting the driven wheel speed in the above equation (1). Meanwhile, as the driving wheel speed, a driving wheel speed indication value M is used instead of an actual measurement value of the rear wheels 14 and 14, which are driving wheels. The slip ratio λ is determined based on the following equation (1A).

$$\text{slip ratio } \lambda = (\text{driven wheel speed} - \text{driving wheel speed indication value } M)/\text{driving wheel speed indication value } M \quad (1A)$$

Note that the driving wheel speed indication value M is a control value used for motor control in the motor control unit 45, which will be described later.

In this embodiment, the driven wheel speed sensor is provided for each of the left and right front wheels 13 and 13, and the driving wheel speed indication value M is independently given for each of the left and right motors 12 and 12, so that the slip ratio λ can be calculated for each of the left and right sides.

Note that any other quantification technique can be used for the slip ratio λ. In that case, the slip ratio detecting sensor 42 is provided with a detection device required for detecting physical quantities used for that quantification technique.

The friction coefficient detecting sensor 44 includes various detection devices for detecting the friction coefficient μ of the ground on which the riding lawn mower 10 is traveling.

In this embodiment, the friction coefficient μ is determined using the following equation (2).

$$\text{friction coefficient } \mu = (1/g \cdot \cos \theta)(dVv/dt) \quad (2)$$

Note that g is the constant of gravitational acceleration (=9.8 m/s$^2$), and dVv/dt is the amount of change in velocity for time dt. Also, θ is a road slope (the inclination of the body 11 in the forward-backward direction).

The friction coefficient detecting sensor 44 includes a gravity sensor (acceleration sensor) for detecting the road slope θ in the above equation (2). Meanwhile, the amount of change in the driven wheel speed, which is used for calculating the above slip ratio λ, is used as the amount of change in the speed of the riding lawn mower 10, and the friction coefficient detecting sensor 44 shares the driven wheel speed sensor, which is provided to the slip ratio detecting sensor 42, in order to detect this driven wheel speed. Using the same driven wheel speed for calculating both of the slip ratio λ and the friction coefficient μ results in a reduced error between the slip ratio λ and the friction coefficient μ and allows them to be accurately determined.

Note that any other technique can be used as a technique for detecting or estimating the friction coefficient μ. In that case, the friction coefficient detecting sensor 44 is provided with a detection device required for detecting physical quantities used for that detection or estimation technique.

Figure 3:
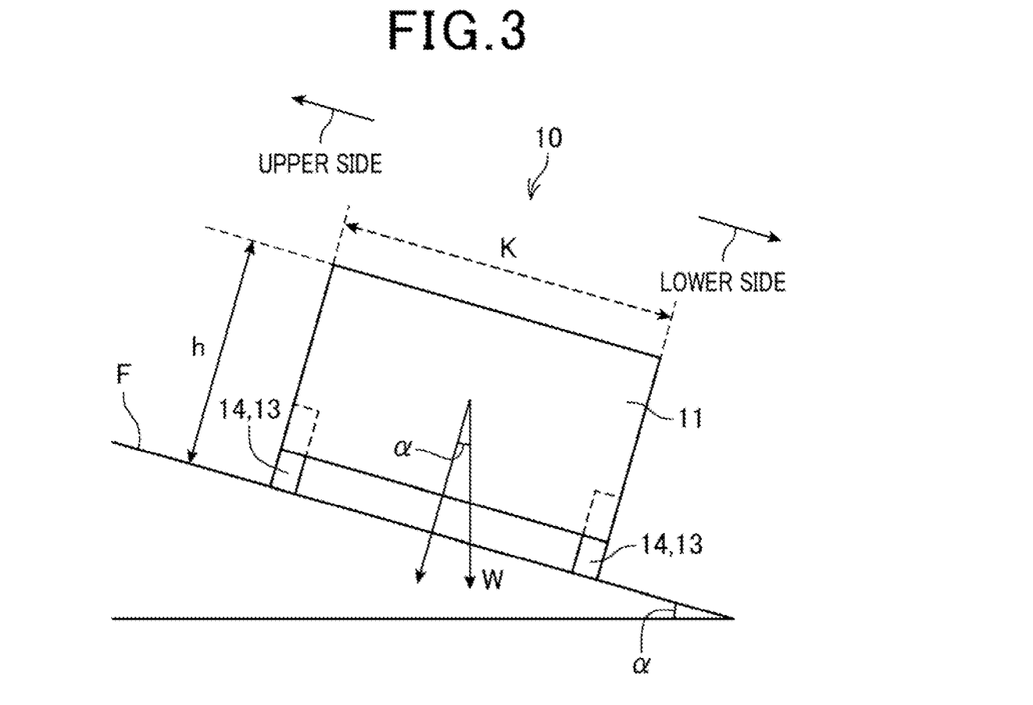
FIG. 3 is a diagram illustrating inclination of the riding lawn mower during a traverse.

Incidentally, as shown in FIG. 3, when the riding lawn mower 10 travels across, or traverses, a slope F with an inclination angle α, the body 11 may lean in the left-right direction (roll direction). In this case, the load applied on the wheels (rear wheels 14 and 14 and front wheels 13 and 13) differs between the left and right sides of the body 11. Since the friction coefficient μ is proportional to the load applied on the wheel, the friction coefficient μ also actually differs between the left and right wheels when traveling on the slope F. Thus, in this embodiment, the friction coefficient μ is corrected for the load applied on each of the left and right wheels, so that the friction coefficient μ is calculated more accurately.

To be specific, defining the vehicle weight, tread (interval between the left and right wheels) and vehicle height of the riding lawn mower 10 as W, K and h, respectively, as shown in FIG. 3, vehicle weights W1 and W2 applied on the respective ones of the left and right wheels are obtained in the following equation (3) and equation (4). By normalizing the denominator and numerator by the vehicle weight W in the equation (3) and equation (4), an equation (5) and an equation (6) are obtained for correction coefficients n1 and n2 for the vehicle weights W1 and W2 applied on the left and right wheels.

$$\text{vehicle weight } W1 = W \times [(W/2) - W(h/K)\alpha]^{-1} \quad (3)$$

$$\text{vehicle weight } W2 = W \times [(W/2) + W(h/K)\alpha]^{-1} \quad (4)$$

$$\text{correction coefficient } n1 = [(1/2) - (h/K)\alpha]^{-1} \quad (5)$$

$$\text{correction coefficient } n2 = [(1/2) + (h/K)\alpha]^{-1} \quad (6)$$

Note that, in the equations (3) to (6), the vehicle weight W1 and the correction coefficient n1 are the vehicle weight applied on the wheels positioned on the lower side along the slope F and its correction coefficient, and the vehicle weight W2 and the correction coefficient n2 are the vehicle weight applied on the wheels positioned on the upper side and its correction coefficient.

Accordingly, assuming that the vehicle weight W is the only load applied on the wheels while traversing, the friction coefficient μ of each of the left and right wheels can be accurately determined by the multiplication by the above correction coefficients n1 and n2.

Note that the inclination angle α is detected by the gravity sensor (acceleration sensor), which is provided to the friction coefficient detecting sensor 44 for detecting the road slope θ. That is, the friction coefficient detecting sensor 44 also functions as an inclination angle detecting section for detecting the inclination angle α.

Returning to FIG. 2, the motor control unit 45 controls each of the left and right motors 12 and 12 independently for the left and right sides, and is provided with an ECU (Electronic Control Unit). The electronic control unit is a circuit unit provided with the above-described computer.

In this embodiment, the motor control unit 45 uses feedback control to determine a target rotation rate indication value for each of the motors 12 and 12 for driving the left and right rear wheels 14 and 14, which are driving wheels.

Specifically, the motor control unit 45 generates the above-mentioned driving wheel speed indication value M, which is an indication value of the driving wheel speed of each of the left and right driving wheels (rear wheels 14 and 14), according to the operation amount of the accelerator pedal 23 (accelerator pedal position), and performs PID (Proportional-Integral-Differential) control by using as a deviation the difference between the driving wheel speed indication value M and the driven wheel speed (i.e., the actual vehicle speed) of the front wheels 13 and 13, which are driven wheels, to determine a target rotation rate indication value for each of the left and right motors 12 and 12. The motor control unit 45 then compares the respective target rotation rate indication values of the left and right motors 12 and 12, and uses the one having a lower rotation rate as the final target rotation rate indication value for both motors 12 and 12 to control the rotation of the left and right motors 12 and 12.

The traction control system 46 is a control mechanism for executing the function of a traction control system for controlling the torque of the rear wheels 14 and 14, which are driving wheels, to prevent the spinning (slipping) of the rear wheels 14 and 14 at the time of a start or an acceleration. The traction control system 46 can use any known control mechanism, and the traction control system 46 generally includes sensors for detecting the driving wheel speed and the driven wheel speed and an electronic control unit for detecting the occurrence of slip of a predetermined magnitude based on the difference in speed between the driving wheels and the driven wheels and performing control to reduce the rotation of the driving wheels (rear wheels 14 and 14) when detecting that the slip occurs. This electronic control unit is a circuit unit provided with a computer, as with the electronic control unit of the motor control unit 45.

Note that the motor control unit 45 and the traction control system 46 may be integrated.

The control unit 40 has various functions for achieving suitable driving operability for both of a case where the ground on which the riding lawn mower 10 is traveling is a lawn and a case where the ground is other than a lawn by controlling the drive of the rear wheels 14 and 14, which are driving wheels, based on the slip ratio λ and the friction coefficient μ. The following describes the control unit 40 in detail.

Figure 4:
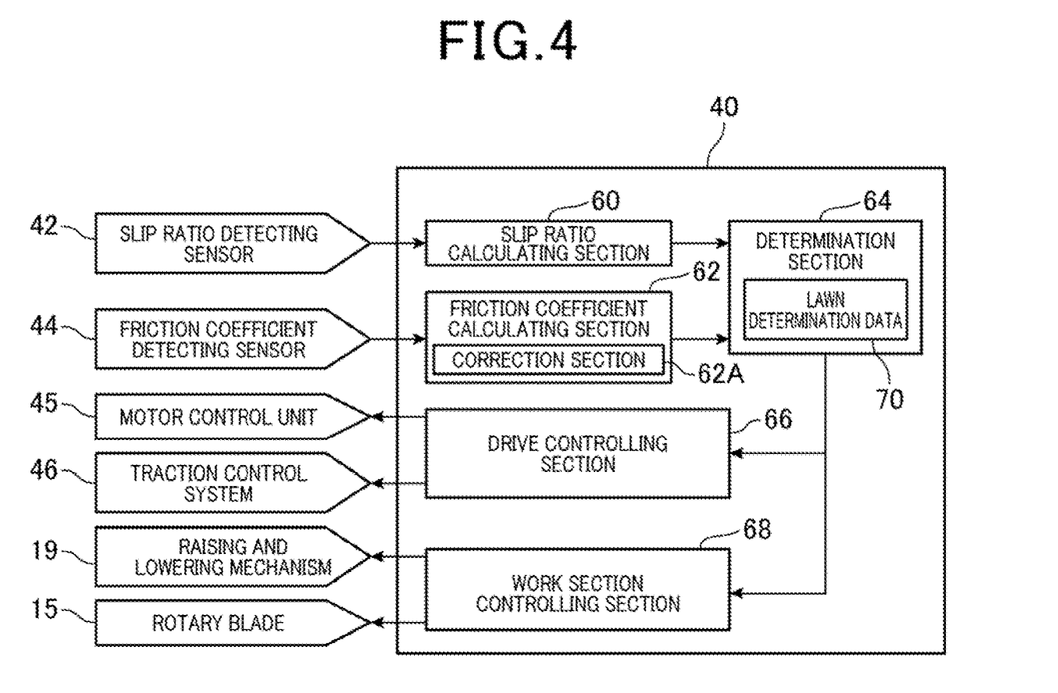
FIG. 4 is a diagram illustrating the functional configuration of a control section.

FIG. 4 is a diagram illustrating the functional configuration of the control unit 40.

The control unit 40 includes a slip ratio calculating section 60, a friction coefficient calculating section 62, a determination section 64, a drive controlling section 66, and a work section controlling section 68.

The slip ratio calculating section 60 sequentially calculates the slip ratio λ using the above equation (1A) based on a detection signal from a detection device provided to the slip ratio detecting sensor 42 and the driving wheel speed indication value M generated by the motor control unit 45.

As described above, the driving wheel speed indication value M is generated for each of the left and right motors 12 and 12, and the slip ratio calculating section 60 separately calculates the slip ratio λ for the left and right sides of the body 11 using each driving wheel speed indication value M.

The friction coefficient calculating section 62 sequentially calculates the friction coefficient μ using the above equation (2) based on a detection signal from a detection device provided to the friction coefficient detecting sensor 44. The friction coefficient calculating section 62 also includes a correction section 62A for correcting the friction coefficient μ by multiplying the friction coefficient μ by the correction coefficients n1 and n2 in the above equation (5) and equation (6), and the correction section 62A corrects the friction coefficient μ to calculate the friction coefficient μ for each of the left and right sides of the body 11.

The determination section 64 stores lawn determination data 70, and determines whether the ground on which the riding lawn mower 10 is traveling is a lawn based on this lawn determination data 70 and the calculated values of the slip ratio λ and friction coefficient μ. The lawn determination data 70 is data indicating a relationship between the slip ratio λ and the friction coefficient μ on a lawn.

Figure 5:
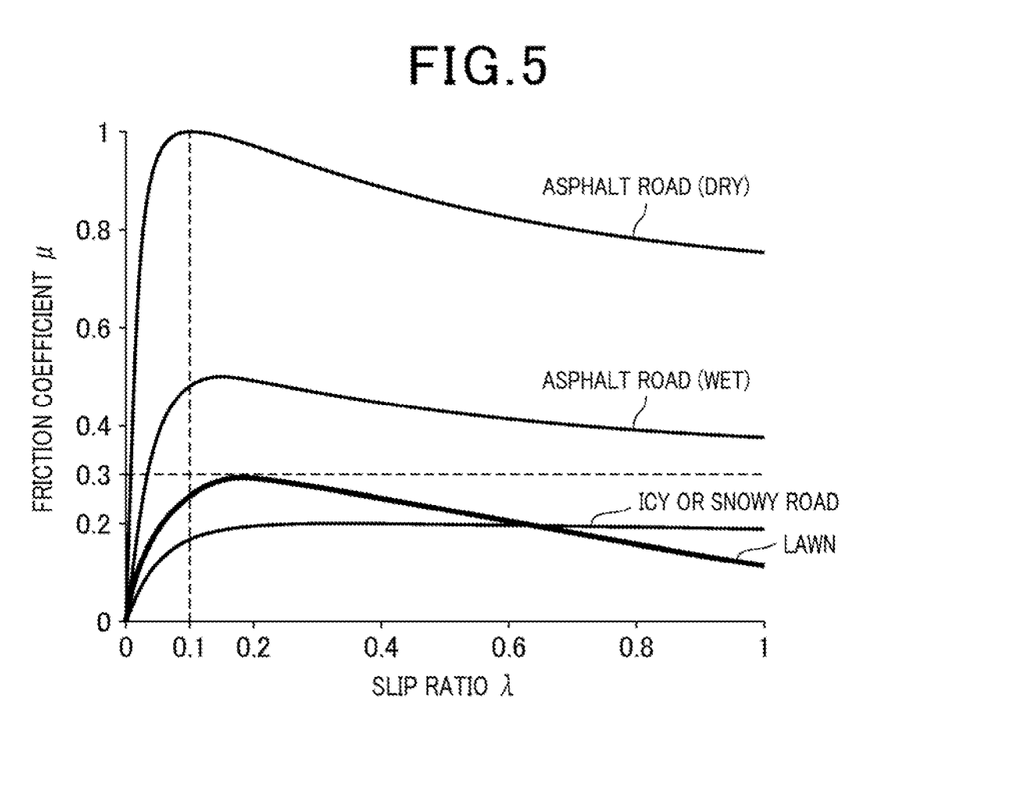
FIG. 5 is a diagram illustrating a relationship between slip ratio and friction coefficient for a lawn, a dry asphalt road, a wet asphalt road, and an icy or snowy road.

FIG. 5 is a diagram illustrating a relationship between the slip ratio λ and the friction coefficient μ for a lawn, a dry asphalt road, a wet asphalt road, and an icy or snowy road.

In the figure, in the range where the slip ratio λ is greater than or equal to 0.1, the range that the friction coefficient μ can take significantly differs between the lawn and the asphalt road, which is an example of a paved road. Specifically, the friction coefficient μ of the lawn ranges up to about 0.3 or less, while the friction coefficient μ of the paved road (asphalt road) takes a value greater than 0.3.

Therefore, whether the ground is a lawn or a paved road can be discriminated by determining whether the friction coefficient μ is about 0.3 or less in the range where the slip ratio λ is greater than or equal to 0.1.

On the other hand, the case where the ground is an icy or snowy road has the same tendency as the case of the lawn in that the friction coefficient μ does not exceed 0.3 in the range where the slip ratio λ is greater than or equal to 0.1. However, in the range where the slip ratio λ is 0.1 to 0.2, the friction coefficient μ of the lawn takes about 0.3, while the friction coefficient μ of the icy or snowy road takes about 0.2, which is a lower value than in the case of the lawn.

Therefore, whether the ground is an icy or snowy road can be discriminated by determining whether the friction coefficient μ is about 0.2 or less in the range where the slip ratio λ is 0.1 to 0.2.

Thus, in the range where the slip ratio λ is 0.1 to 0.2, it can be considered that the ground is a lawn when the friction coefficient μ is about 0.3, and the ground is other than a lawn (a paved road (asphalt road) or an icy or snowy road) when the friction coefficient μ exceeds 0.3 or is about 0.2.

In particular, according to the relationship shown in FIG. 5, the lawn and the icy or snowy road can be clearly discriminated by determining whether the friction coefficient μ is 0.3 when the slip ratio λ is 0.1.

This relationship that "the friction coefficient μ is about 0.3 when the slip ratio λ is 0.1" is indicated as information for discriminating the lawn in the above-described lawn determination data 70.

When the slip ratio λ and the friction coefficient μ are input, the determination section 64 determines whether the ground on which the riding lawn mower 10 is traveling is a lawn or is other than a lawn based on the slip ratio λ and friction coefficient μ and the lawn determination data 70.

As described above, the slip ratio λ and friction coefficient μ are separately calculated for the left and right sides of the body 11, and the determination section 64 also performs the determination on the ground on which the riding lawn mower 10 is traveling for each of the left and right sides of the body 11.

The drive controlling section 66 switches the control for the motors 12 and 12 between lawn traveling control and non-lawn traveling control according to whether the ground on which the riding lawn mower 10 is traveling is a lawn or is other than a lawn.

More specifically, when the ground is a lawn, the drive controlling section 66 performs the lawn traveling control, and the lawn traveling control involves increasing the torque of the motors 12 and 12 by controlling the motor control unit 45 to rotate the driving wheels (rear wheels 14 and 14) at a torque greater than or equal to a predetermined torque.

On the other hand, when the ground is other than a lawn, the drive controlling section 66 performs the non-lawn traveling control to decrease the torque of the motors 12 and 12 to rotate the driving wheels (rear wheels 14 and 14) at a torque less than the predetermined torque.

As a result, when traveling on a lawn, the impossibility of moving forward due to insufficient torque is eliminated, and further, the riding lawn mower 10 can achieve a driving operability of high torque and resistance to turning (i.e., less prone to deviation of the traveling path during the lawn cutting work).

On the other hand, when traveling on a ground other than a lawn (e.g., an asphalt-paved road), the impossibility to smoothly travel due to a slip caused by excessively high torque is eliminated, and further, the riding lawn mower 10 can achieve a driving operability of low torque and easy turning (ability to make sharp turns).

In addition to controlling the motors 12 and 12, the drive controlling section 66 also controls the traction control system 46 for the cases where the ground on which the riding lawn mower 10 is traveling is a lawn and is other than a lawn. Specifically, the drive controlling section 66 turns "on" the traction control by the traction control system 46 when traveling on a lawn and turns "off" the traction control when traveling on a ground other than a lawn.

As a result, when traveling on a lawn, the traction control is turned "on", so that, when a slip occurs, the traction control system 46 decreases the rotation rate of the motors 12 and 12, which can prevent lawn removal due to the slip.

On the other hand, when traveling on a ground other than a lawn, the traction control is turned "off", so that, at the time of a start or an acceleration, the rotation rate of the motors 12 and 12 is not decreased and is accelerated according to the operation on the accelerator pedal 23 by the passenger Q. This can prevent lack of acceleration feeling responsive to the accelerator operation at the time of a start on a ground other than a lawn, e.g., a paved road, due to the traction control maintained turned "on".

The work section controlling section 68 controls the above-mentioned rotary blade 15, which is the work section, and the raising and lowering mechanism 19 according to whether the ground on which the riding lawn mower 10 is traveling is a lawn.

Specifically, when the ground is other than a lawn, the work section controlling section 68 performs control to stop and put the rotary blade 15 in a non-operational state because the lawn cutting work is not needed, and controls the raising and lowering mechanism 19 to elevate the rotary blade housing 16 to maintain the rotary blade 15 separated from the ground as compared to when traveling on a lawn.

In this manner, when the riding lawn mower 10 is traveling on a ground other than a lawn, the rotary blade 15 automatically stops and is maintained in the non-operational state, which can prevent the rotary blade 15 from hitting the road surface e.g., when traveling on a paved road such as an asphalt road to damage the rotary blade 15. Further, maintaining the rotary blade 15 in an elevated state so as to be separated from the ground can better ensure that the rotary blade 15 and the road surface are prevented from contact, and better ensure that the rotary blade 15 is prevented from being damaged.

Here, when traveling on a lawn, only one of the left and right sides of the riding lawn mower 10 may run onto a ground other than the lawn. In this case, the determination section 64 determines that the ground on one of the left and right sides is a lawn and the ground on the other side is other than a lawn.

When such a determination is made, the drive controlling section 66 performs the same control as in the case of traveling on a lawn. In this manner, even when a part of the body 11 travels on a ground other than a lawn, a torque required for traveling on the lawn is obtained, and the driving operability on the lawn can be improved.

Figure 6:
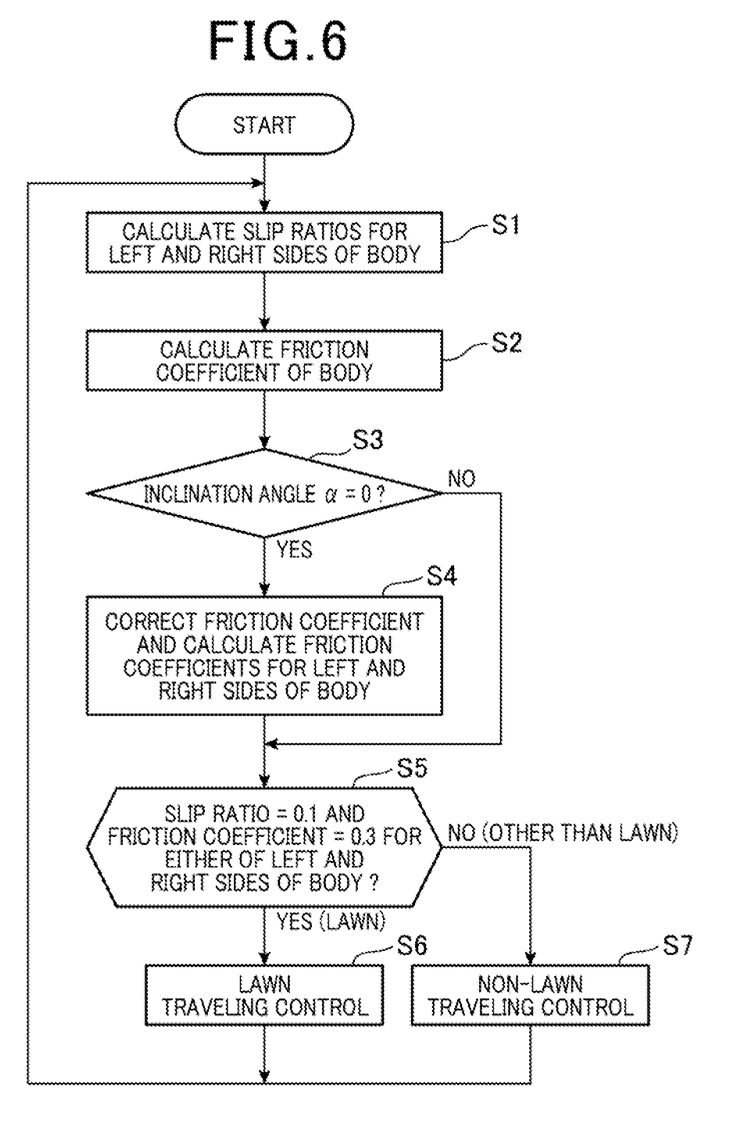
FIG. 6 is a flow chart illustrating operations of the riding lawn mower.

FIG. 6 is a flow chart illustrating operations of the riding lawn mower 10.

While the riding lawn mower 10 travels, the slip ratio calculating section 60 sequentially calculates the slip ratio $\lambda$ based on the above equation (1A) for each of the left and right sides of the body 11, and inputs the slip ratio $\lambda$ to the determination section 64 (step S1).

Also, the friction coefficient calculating section 62 calculates the friction coefficient $\mu$ based on the above equation (2) (step S2). If the inclination angle $\alpha$ is not "0" because, for example, the riding lawn mower 10 is traversing (step S3: YES), the correction section 62A multiplies the friction coefficient $\mu$ calculated in step S2 by the correction coefficients n1 and n2 in the above equation (5) and equation (6) to calculate friction coefficients $\mu$ for the left and right sides of the body (step S4). Note that, if the inclination angle is "0" (step S3: NO), the friction coefficient $\mu$ calculated in step S2 is used as the friction coefficients $\mu$ for left and right sides of the body 11.

The determination section 64 then determines whether the ground on which the riding lawn mower 10 is traveling is a lawn on at least one of the left and right sides based on the slip ratios $\lambda$ and friction coefficients $\mu$ for the left and right sides of the body 11. Specifically, the determination section 64 determines whether the slip ratio $\lambda$ is 0.1 and the friction coefficient $\mu$ is about 0.3 for either of the left and right sides of the body 11 (step S5).

If the ground on which the riding lawn mower 10 is traveling is a lawn on at least one of the left and right sides of the body 11 (step S5: YES), the control unit 40 performs the lawn traveling control (step S6). On the other hand, if the ground on which the riding lawn mower 10 is traveling is a ground other than a lawn on both of the left and right sides of the body 11 (step S5: NO), the control unit 40 performs the non-lawn traveling control (step S7).

In the lawn traveling control (step S6), the drive controlling section 66 controls the motor control unit 45 to increase the output torque of the motors 12 and 12, and turns "on" the traction control of the traction control system 46.

In this manner, the riding lawn mower 10 can achieve a driving operability of high torque and resistance to turning (i.e., less prone to deviation of the traveling path during the lawn cutting work). Further, by turning "on" the traction control, lawn removal due to a slip occurring at the time of a start or an acceleration can be prevented.

On the other hand, in the non-lawn traveling control (step S7), the drive controlling section 66 controls the motor control unit 45 to decrease the output torque of the motors 12 and 12, and turns "off" the traction control of the traction control system 46. Further, the work section controlling section 68 stops the rotary blade 15 to be maintained in a non-operational state, and controls the raising and lowering mechanism 19 to elevate the rotary blade housing 16 to separate the rotary blade 15 from the ground.

In this manner, the riding lawn mower 10 can achieve a driving operability of low torque and easy turning (ability to make sharp turns). Further, by turning "off" the traction control, acceleration responsive to the operation on the accelerator pedal 23 by the passenger Q can be achieved at the time of a start or an acceleration. In addition, since the rotary blade 15 automatically stops to be maintained in the non-operational state and the rotary blade 15 is elevated and separated from the ground, this can better ensure that the rotary blade 15 and the road surface are prevented from contact, and better ensure that the rotary blade 15 is prevented from being damaged.

The operations of step S1 to step S7 described above are repeatedly performed while the riding lawn mower 10 travels. When the ground on which the riding lawn mower 10 is traveling changes between a lawn and a ground other than a lawn (e.g., a paved road such as an asphalt road), this change is followed by a smooth change between the lawn traveling control of step S6 and the non-lawn traveling control of step S7.

According to the embodiment, the following effects are achieved.

The riding lawn mower 10 of this embodiment is configured to determine whether the ground on which the riding lawn mower 10 is traveling is a lawn based on a relationship between a slip ratio $\lambda$ and a friction coefficient $\mu$ while traveling, and controls the motors 12 and 12 for driving the driving wheel (rear wheels 14 and 14) according to the determination result.

In this manner, by controlling the motors 12 and 12 according to whether the ground on which the riding lawn mower 10 is traveling is a lawn, suitable driving operability can be achieved for both of a case where the ground on which the riding lawn mower 10 is traveling is a lawn and a case where the ground is other than a lawn.

The riding lawn mower 10 of this embodiment is configured to perform lawn traveling control to rotate the driving wheels (rear wheels 14 and 14) at a torque greater than or equal to a predetermined torque when the ground on which the riding lawn mower 10 is traveling is a lawn, and perform non-lawn traveling control to rotate the driving wheels at a torque less than the predetermined torque when the ground on which the riding lawn mower 10 is traveling is other than a lawn.

In this manner, when traveling on a lawn, a torque required for traveling on the lawn is obtained to improve the driving operability on the lawn, and when traveling on a ground other than a lawn, the torque is decreased so that, for example, a slip can be prevented while the riding lawn mower 10 is traveling on a paved road or the like to improve the driving operability on the paved road.

The riding lawn mower 10 of this embodiment puts the rotary blade 15 for cutting lawn in a non-operational state when the ground on which the riding lawn mower 10 is traveling is other than a lawn.

This can prevent the rotary blade 15 from hitting the road surface and being damaged while the riding lawn mower 10 is traveling on a ground other than a lawn, e.g., a paved road.

The riding lawn mower 10 of this embodiment puts the rotary blade 15 in an elevated state when the ground on which the riding lawn mower 10 is traveling is other than a lawn.

This can better ensure that the rotary blade 15 and the road surface are prevented from contact and better ensure that the rotary blade 15 is prevented from being damaged while the riding lawn mower 10 is traveling on a ground other than a lawn, e.g., a paved road.

The riding lawn mower 10 of this embodiment is configured to turn on the traction control system when the ground on which the riding lawn mower 10 is traveling is a lawn, and turn off the traction control system when the ground on which the riding lawn mower 10 is traveling is other than a lawn.

In this manner, when the riding lawn mower 10 is traveling on a lawn, the traction control is turned "on", so that lawn removal due to a slip occurring at the time of a start or an acceleration can be prevented. Also, when the riding lawn mower 10 is traveling on a ground other than a lawn, acceleration responsive to the operation on the accelerator pedal 23 by the passenger Q can be obtained at the time of a start or an acceleration.

The riding lawn mower 10 of this embodiment is configured to calculate the slip ratio $\lambda$ and the friction coefficient $\mu$ for each of the left and right sides of the body 11, and perform the lawn traveling control when determining that the ground on which the riding lawn mower 10 is traveling is a lawn for at least one of the left and right sides of the body 11 based on the slip ratio $\lambda$ and the friction coefficient $\mu$.

In this manner, when the wheels on one side of the body 11 are traveling on a lawn, even when the other wheels are traveling on a ground other than a lawn (e.g., a paved road), the lawn traveling control is performed, so that, even when only one side of the body 11 runs onto a paved road or the like, a torque required for traveling on a lawn can be obtained to maintain driving operability suitable for traveling on the lawn.

The riding lawn mower 10 of this embodiment is configured to correct the friction coefficient $\mu$ based on the inclination angle $\alpha$ of the body 11 in the left-right direction.

The friction coefficient $\mu$ can be calculated more accurately, and the accuracy of determination by the determination section 64 and the accuracy of control by the drive controlling section 66 and the like are improved.

The riding lawn mower 10 of this embodiment is configured to calculate the slip ratio $\lambda$ based on the driven wheel speed of the driven wheels (front wheels 13 and 13) and the driving wheel speed indication value M of the driving wheels, and calculate the friction coefficient $\mu$ based on the driven wheel speed of the driven wheels, which is used for calculating the slip ratio.

Using the same driven wheel speed for calculating both of the slip ratio $\lambda$ and the friction coefficient $\mu$ results in a reduced error between the slip ratio $\lambda$ and the friction coefficient $\mu$ and allows them to be accurately determined. Also, the accuracy of determination by the determination section 64 and the accuracy of control by the drive controlling section 66 and the like can be better improved.

The above-described embodiment is merely an example aspect of the present invention, and any variations and applications are possible without departing from the spirit of the present invention.

In the above-described embodiment, when the ground on which the riding lawn mower 10 is traveling is other than a lawn, the determination section 64 may further determine the state of the ground (such as a dry asphalt road, a wet asphalt road, and an icy or snowy road) based on the relationship between the slip ratio $\lambda$ and the friction coefficient $\mu$. In this case, when the riding lawn mower 10 is traveling on a ground other than a lawn, the drive controlling section 66 may perform control according to the state of the road surface.

The functional blocks shown in FIG. 4 are a schematic diagram illustrating the functional configuration of the control unit 40 divided according to principal processing operations for easy understanding of the invention of the present application, and the functional configuration of the control unit 40 can also be divided into even more components according to processing operations. Also, it can be divided such that one component performs even more operations.

Also, the operation of each component of the control unit 40 shown in FIG. 4 may be performed by one piece of hardware, or may be performed by a plurality of pieces of hardware. Also, the operation of each component may be implemented by one program, or may be implemented by a plurality of programs.

Further, a part of the functional configuration of the control unit 40 shown in FIG. 4 (e.g., the slip ratio calculating section 60, the friction coefficient calculating section 62, the determination section 64 and the like) may be provided in an external computer (such as a personal computer, a smartphone, or a server computer) in communication with the riding lawn mower 10, for example, in a wireless manner.

That is, each functional unit shown in FIG. 4 may be configured as a control system consisting of a plurality of pieces of hardware or programs, instead of the one control unit 40.

Note that the present invention can be applied to other passenger work machines including a cultivator, a snowplow and the like, not being limited to a lawn mower. The present invention can also be applied to a passenger work machine that drives driving wheels by a power source other than a motor (e.g., an engine).

Further, it is apparent that the present invention may be applied to a work machine not for passenger use.

REFERENCE SIGNS LIST 10 riding lawn mower (lawn mower)
11 body
12 motor (power source)
13 front wheel (driven wheel)
14 rear wheel (driving wheel)
15 rotary blade (blade)
19 raising and lowering mechanism
40 control unit
42 slip ratio detecting sensor
44 friction coefficient detecting sensor
45 motor control unit
46 traction control system
60 slip ratio calculating section
62 friction coefficient calculating section
62A correction section
64 determination section
66 drive controlling section
68 work section controlling section
70 lawn determination data
M driving wheel speed indication value n1, n2 correction coefficient
α inclination angle
θ road slope
λ slip ratio
μ friction coefficient

The invention claimed is:

1. A lawn mower comprising:
a motor configured to drive a driving wheel provided to a body;
a slip ratio calculating section configured to calculate a slip ratio indicating a magnitude of slip of the driving wheel while the lawn mower is traveling;
a friction coefficient calculating section configured to calculate a friction coefficient of a ground on which the lawn mower is traveling;
a determination section configured to determine whether the ground on which the lawn mower is traveling is a lawn based on lawn determination data indicating a relationship between the slip ratio calculated by the slip ratio calculating section and the friction coefficient calculated by the friction coefficient calculating section; and
a drive controlling section configured to control the motor based on a determination result of the determination section, the determination result being by the lawn determination data as to whether the ground on which the lawn mower is traveling is a lawn.

2. The lawn mower according to claim 1, wherein
when the determination section determines that the ground on which the lawn mower is traveling is a lawn, the drive controlling section performs lawn traveling control to rotate the driving wheel at a torque greater than or equal to a predetermined torque, and
when the determination section determines that the ground on which the lawn mower is traveling is other than a lawn, the drive controlling section performs non-lawn traveling control to rotate the driving wheel at a torque less than the predetermined torque.

3. The lawn mower according to claim 2, wherein
the lawn mower comprises a work section controlling section configured to control a lawn cutting blade, and
when the determination section determines that the ground on which the lawn mower is traveling is other than a lawn, the work section controlling section puts the lawn cutting blade in a non-operational state.

4. The lawn mower according to claim 3, wherein
when the determination section determines that the ground on which the lawn mower is traveling is other than a lawn, the work section controlling section puts the lawn cutting blade in an elevated state.

5. The lawn mower according to claim 2, wherein:
the lawn mower comprises a traction control system configured to implement a traction control system,
when the determination section determines that the ground on which the lawn mower is traveling is a lawn, the drive controlling section turns on the traction control system, and
when the determination section determines that the ground on which the lawn mower is traveling is other than a lawn, the drive controlling section turns off the traction control system.

6. The lawn mower according to claim 2, wherein:
the slip ratio calculating section calculates a slip ratio for each of left and right sides of the body,
the friction coefficient calculating section calculates a friction coefficient for each of the left and right sides of the body, and
when the determination section determines that the ground on which the lawn mower is traveling is a lawn for at least one of the left and right sides of the body, the drive controlling section performs the lawn traveling control.

7. The lawn mower according to claim 1, wherein:
the lawn mower comprises an inclination angle detecting section configured to detect an inclination angle of the body in a left-right direction, and
the friction coefficient calculating section comprises a correction section configured to correct the friction coefficient based on the inclination angle detected by the inclination angle detecting section.

8. The lawn mower according to claim 1, wherein:
the body is provided with a driven wheel,
the slip ratio calculating section calculates the slip ratio based on a driven wheel speed of the driven wheel and a driving wheel speed indication value of the driving wheel, and
the friction coefficient calculating section calculates the friction coefficient based on the driven wheel speed, of the driven wheel, used for calculating the slip ratio.

9. A control system for a lawn mower comprising a body and a motor configured to drive a driving wheel provided to the body, the control system comprising:
a slip ratio calculating section configured to calculate a slip ratio indicating a magnitude of slip of the driving wheel while the lawn mower travels;
a friction coefficient calculating section configured to calculate a friction coefficient of a ground on which the lawn mower is traveling;
a determination section configured to determine whether the ground on which the lawn mower is traveling is a lawn based on lawn determination data indicating a relationship between the slip ratio calculated by the slip ratio calculating section and the friction coefficient calculated by the friction coefficient calculating section; and
a control section configured to control the motor based on a determination result of the determination section, the determination result being by the lawn determination data as to whether the ground on which the lawn mower is traveling is a lawn.

10. The lawn mower according to claim 3, wherein
the lawn mower comprises a traction control system configured to implement a traction control system,
when the determination section determines that the ground on which the lawn mower is traveling is a lawn, the drive controlling section turns on the traction control system, and
when the determination section determines that the ground on which the lawn mower is traveling is other than a lawn, the drive controlling section turns off the traction control system.

11. The lawn mower according to claim 4, wherein
the lawn mower comprises a traction control system configured to implement a traction control system,
when the determination section determines that the ground on which the lawn mower is traveling is a lawn, the drive controlling section turns on the traction control system, and
when the determination section determines that the ground on which the lawn mower is traveling is other than a lawn, the drive controlling section turns off the traction control system.

12. The lawn mower according to claim 3, wherein
the slip ratio calculating section calculates a slip ratio for each of left and right sides of the body,
the friction coefficient calculating section calculates a friction coefficient for each of the left and right sides of the body, and
when the determination section determines that the ground on which the lawn mower is traveling is a lawn for at least one of the left and right sides of the body, the drive controlling section performs the lawn traveling control.

13. The lawn mower according to claim 4, wherein
the slip ratio calculating section calculates a slip ratio for each of left and right sides of the body,
the friction coefficient calculating section calculates a friction coefficient for each of the left and right sides of the body, and
when the determination section determines that the ground on which the lawn mower is traveling is a lawn for at least one of the left and right sides of the body, the drive controlling section performs the lawn traveling control.

14. The lawn mower according to claim 5, wherein
the slip ratio calculating section calculates a slip ratio for each of left and right sides of the body,
the friction coefficient calculating section calculates a friction coefficient for each of the left and right sides of the body, and
when the determination section determines that the ground on which the lawn mower is traveling is a lawn for at least one of the left and right sides of the body, the drive controlling section performs the lawn traveling control.

15. The lawn mower according to claim 2, wherein
the lawn mower comprises an inclination angle detecting section configured to detect an inclination angle of the body in a left-right direction, and
the friction coefficient calculating section comprises a correction section configured to correct the friction coefficient based on the inclination angle detected by the inclination angle detecting section.

16. The lawn mower according to claim 3, wherein
the lawn mower comprises an inclination angle detecting section configured to detect an inclination angle of the body in a left-right direction, and
the friction coefficient calculating section comprises a correction section configured to correct the friction coefficient based on the inclination angle detected by the inclination angle detecting section.

17. The lawn mower according to claim 4, wherein
the lawn mower comprises an inclination angle detecting section configured to detect an inclination angle of the body in a left-right direction, and
the friction coefficient calculating section comprises a correction section configured to correct the friction coefficient based on the inclination angle detected by the inclination angle detecting section.

18. The lawn mower according to claim 5, wherein
the lawn mower comprises an inclination angle detecting section configured to detect an inclination angle of the body in a left-right direction, and
the friction coefficient calculating section comprises a correction section configured to correct the friction coefficient based on the inclination angle detected by the inclination angle detecting section.

19. The lawn mower according to claim 6, wherein
the lawn mower comprises an inclination angle detecting section configured to detect an inclination angle of the body in a left-right direction, and
the friction coefficient calculating section comprises a correction section configured to correct the friction coefficient based on the inclination angle detected by the inclination angle detecting section.

20. The lawn mower according to claim 2, wherein
the body is provided with a driven wheel,
the slip ratio calculating section calculates the slip ratio based on a driven wheel speed of the driven wheel and a driving wheel speed indication value of the driving wheel, and
the friction coefficient calculating section calculates the friction coefficient based on the driven wheel speed, of the driven wheel, used for calculating the slip ratio.

21. The lawn mower according to claim 1, wherein
the lawn determination data indicates the relationship that the friction coefficient is about 0.3 when the slip ratio is 0.1.

22. The lawn mower according to claim 9, wherein
the lawn determination data indicates the relationship that the friction coefficient is about 0.3 when the slip ratio is 0.1.

* * * * *